(12) United States Patent
Braunschweiler

(10) Patent No.: US 9,676,229 B2
(45) Date of Patent: Jun. 13, 2017

(54) WHEEL STRUCTURE FOR AN AUTOMOBILE

(71) Applicant: Cool Wheels AG, Rüschlikon (CH)

(72) Inventor: Hans Georg Braunschweiler, Rüschlikon (CH)

(73) Assignee: Cool Wheels AG, Rüschlikon (CH)

( * ) Notice: Subject to any disclaimer, the term of this patent is extended or adjusted under 35 U.S.C. 154(b) by 141 days.

(21) Appl. No.: 14/419,325

(22) PCT Filed: Jul. 29, 2013

(86) PCT No.: PCT/EP2013/065901
§ 371 (c)(1),
(2) Date: Feb. 3, 2015

(87) PCT Pub. No.: WO2014/023598
PCT Pub. Date: Feb. 13, 2014

(65) Prior Publication Data
US 2015/0174951 A1    Jun. 25, 2015

(30) Foreign Application Priority Data

Aug. 8, 2012 (CH) .................. 1298/12

(51) Int. Cl.
*B60B 1/14* (2006.01)
*B60B 3/04* (2006.01)

(52) U.S. Cl.
CPC ............... *B60B 1/14* (2013.01); *B60B 3/041* (2013.01); *B60B 2310/224* (2013.01);
(Continued)

(58) Field of Classification Search
CPC ..... B60B 1/14; B60B 3/041; B60B 2900/121; B60B 2310/314; B60B 2310/224; B60B 2310/305; B60B 2360/104; B60Y 2200/11
(Continued)

(56) References Cited

U.S. PATENT DOCUMENTS 1,556,888 A    10/1925   Worthington
3,567,285 A *  3/1971    Faurot ............... B60B 1/003
                                              29/894.38
(Continued)

FOREIGN PATENT DOCUMENTS

DE    1 100 487 B     2/1961
EP    0 935 536 B1   12/2001

OTHER PUBLICATIONS

International Search Report dated Aug. 23, 2013 for International Application No. PCT/EF2013/065901.

*Primary Examiner* — S. Joseph Morano
*Assistant Examiner* — Jean Charleston
(74) *Attorney, Agent, or Firm* — Morgan, Lewis & Bockius LLP

(57) ABSTRACT

A wheel structure for an automobile having a wheel rim, a central part, and spoke elements connected to the wheel rim and individually connected to the central part. Spoke elements have through-holes for wheel screws or bolts and the central part has holes for screwing in or pushing through same wheel screws or bolts. The through-holes of the spoke elements form a first hole circle and the holes in the central part form a second hole circle. The diameter of the first hole circle is smaller than the diameter of the second hole circle if the spoke elements are not connected to the central part, and the diameter of the first hole circle corresponds to the
(Continued)

diameter of the second hole circle if the spoke elements are also connected to the central part.

9 Claims, 4 Drawing Sheets

(52) U.S. Cl.
CPC ... *B60B 2310/305* (2013.01); *B60B 2310/314* (2013.01); *B60B 2360/104* (2013.01); *B60B 2900/121* (2013.01); *B60Y 2200/11* (2013.01)

(58) Field of Classification Search
USPC ......... 301/64.1, 66, 79, 80, 84, 104, 57, 9.1, 301/35.54, 64.101
See application file for complete search history.

(56) References Cited

U.S. PATENT DOCUMENTS

| | | | | |
|---|---|---|---|---|
| 6,042,194 | A * | 3/2000 | Fitz | B60B 1/10 29/894.34 |
| 6,244,669 | B1 * | 6/2001 | Braunschweiler | B60B 9/02 301/79 |
| 6,439,671 | B1 * | 8/2002 | Lehnhardt | B21C 23/14 29/894.341 |
| 7,681,958 | B1 * | 3/2010 | Bagdasarian | B60B 1/14 301/67 |
| 2001/0013721 | A1 * | 8/2001 | Ishii | A61G 5/02 301/79 |
| 2003/0038559 | A1 * | 2/2003 | Casey | H02K 11/042 310/68 D |

* cited by examiner

WHEEL STRUCTURE FOR AN AUTOMOBILE

TECHNICAL FIELD

The present invention relates to a wheel structure for an automobile having a wheel rim, a central part and spoke elements, which can be individually connected to the wheel rim and the central part. The spoke elements are provided with through-holes for wheel screws or bolts and the central part is provided with holes for screwing in or pushing through same wheel screws or bolts. The through-holes of the spoke elements form a first hole circle when the spoke elements are connected to the wheel rim. The holes in the central part form a second hole circle.

PRIOR ART

Such a wheel structure is known form EP 0 935 536 B1. In the known wheel structure, the spoke elements, designated as profile elements, are welded to the wheel rim. As central part, either a plate is provided or, if such a plate is dispensed with, a wheel hub, i.e. a part of the axle structure of the automobile. In so far as a wheel hub of an automobile forms the central part, the wheel structure is only complete and reinforced when it is mounted in a roadworthy manner. By including the wheel hub into the wheel structure, a not insignificant saving on weight is produced. In both cases, the spoke elements, on their screwing to the central part, are pressed at an angle with respect to the wheel axle so that a central opening between them narrows in the manner of a chuck, which is used for the hub centering of the wheel structure. On the other hand, the welded connections between the spoke elements and the wheel rim are under torsional stress here such that alternating stresses of the welded connections occurring during driving are shifted into the pressure region, which basically is to have a favourable effect on the stability of the welded connections.

DESCRIPTION OF THE INVENTION

The invention sets itself the task of structurally improving a wheel structure of the type mentioned in the introduction, in particular with regard to a simpler production and/or its loading capacity and stability. This problem is solved by a wheel structure having the features of claim 1. The wheel structure according to the invention is accordingly characterized in that the diameter of the first hole circle is smaller than the diameter of the second hole circle if the spoke elements are not connected to the central part, and that the diameter of the first hole circle corresponds to the diameter of the second hole circle if the spoke elements are also connected to the central part.

Through this construction, the spoke elements are stressed or respectively pretensioned in radial direction outwards against the wheel rim, when they are also connected to the central part. This makes it possible to configure the connection between the spoke elements and the wheel rim in a structurally simple manner. A particularly simple connection is, for example, a screw connection by means of axially aligned fastening screws. The alternating stresses acting on such screw connections during driving are shifted by the radially outwardly acting pressure into a more favourable region for their stability and durability. Therefore, in a similar manner to EP 0 935 536 B1, use is made of a pretension of the connections, but in a different way and more effectively, because the alternating stresses act substantially radially: pressure on ground contact, traction on the opposite side.

Unlike EP 0 935 536. B1, in addition the central opening between the spoke elements widens with the connection of the spoke elements to the central part, instead of reducing in size. A hub centering, as in EP 0 935 536 B1 is also able to be dispensed with, as it frequently only serves as an installation aid and the actual centering takes place via the wheel screws or bolts.

Through the configuration according to the invention, a radial centering of the wheel rim is produced as a further advantage. Wheel rims for automobile wheels are mostly produced today by rolling or pressing. The geometric radial inaccuracies and deviations from the circular shape lie here in the range of a few millimeters. Through the radial pretension, the wheels are calibrated to circles.

The central part can, as also already provided in EP 0 935 536 B1, be a wheel hub and thereby a part of the axle structure of the automobile, in so far as the through-holes on the spoke elements have respectively a depression in the form of a spherical or conical collar surface and in so far as their diameter is dimensioned to be so great that they also respectively completely overlap with the corresponding holes of the first hole circle in the hub when the spoke elements are only connected to the wheel rim, but not also to the central part. It shall be understood that for the screw connection of the spoke elements in this case, wheel screws or wheel bolts or respectively nuts for wheel bolts are to be used, which are provided with a corresponding spherical or conical collar surface. On tightening of the screws or nuts, their spherical or conical collar surfaces are drawn into the corresponding depressions. Here, the diameter of the first hole circle, formed by the through-holes on the spoke elements, is extended to correspond to the diameter of the second hole circle and the mentioned pretension is established.

On the other hand, a plate suitable for mounting on a hub of an axle structure of an automobile can also be provided as central part, wherein in this case the plate has a section in the form of an outer taper, wherein the spoke elements together form a corresponding inner taper, and wherein the plate is pressed with its outer taper into this inner taper with extending of the diameter of the first hole circle, formed by the through-holes on the spoke elements, to correspond to the diameter of the second hole circle.

According to a preferred embodiment, in the wheel structure according to the invention the spoke elements are screwed to the wheel rim with axially aligned fastening screws. For this, a radially inwardly projecting rib, which is simple to produce, can be formed on the wheel rim.

Further preferably, the spoke elements are provided with respectively a pair of spokes which continue at the central part into a spoke head provided with one of the through-holes. These spokes can be connected with one another on the wheel rim via a cross web. Through-holes for the fastening screws can then be likewise provided in the cross web.

According to a further preferred embodiment, the spoke elements are embodied in one piece. With regard to the forces which are to be received, it is favourable if the spokes have a greater extent in axial direction than in circumferential direction.

BRIEF DESCRIPTION OF THE DRAWINGS

There are shown.

In the figures, out of respectively multiple identical parts which are present, respectively only one of these parts is provided with a reference number.

WAYS TO EXECUTE THE INVENTION

Figure 1:
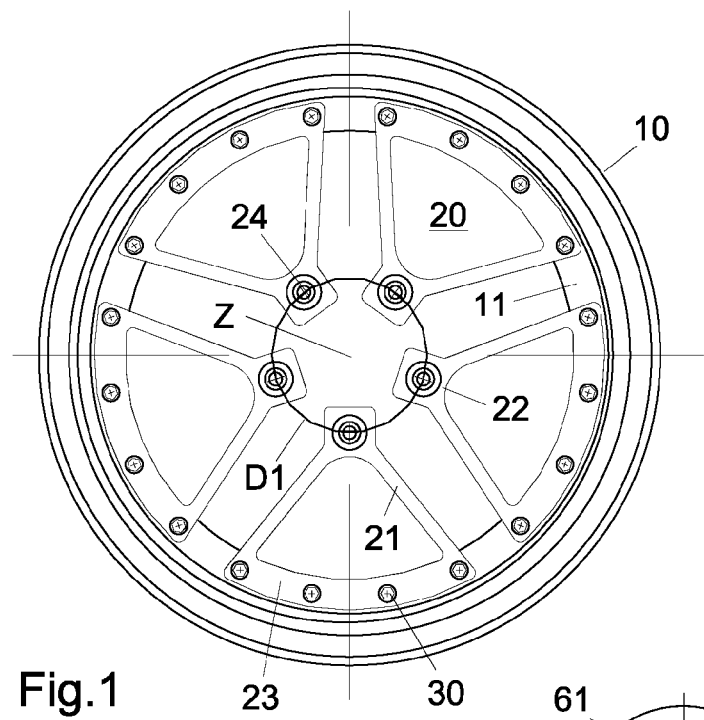
FIG. 1 an arrangement with wheel rim with five spoke elements in top view for the production of a wheel structure according to the invention.

In the arrangement of FIG. 1, 10 designates a wheel rim and designates five identical spoke elements, distributed under identical relative angles about the centre Z. The spoke elements 20 have respectively a pair of spokes 21, which continue towards the centre Z into a spoke head 22 and are connected with one another on the wheel rim 10 via a cross web 23. A through-hole 24 is present respectively in the spoke head 22. The cross webs 23 are screwed to an inwardly radially projecting rib 11 of the wheel rim 10 by respectively two axially aligned fastening screws 30. The spoke elements 20 are connected with one another solely via this connection with the wheel rim 10. The spoke heads 22 lie here freely without reciprocal contact, wherein the through-holes 24 in the spoke heads 22 form a first hole circle with a diameter D1.

Figure 2B:
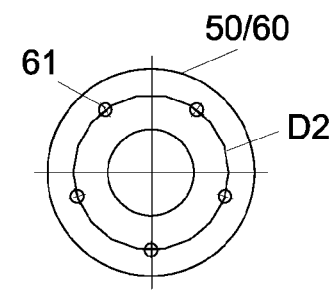
FIG. 2b the wheel hub.
Figure 2A:
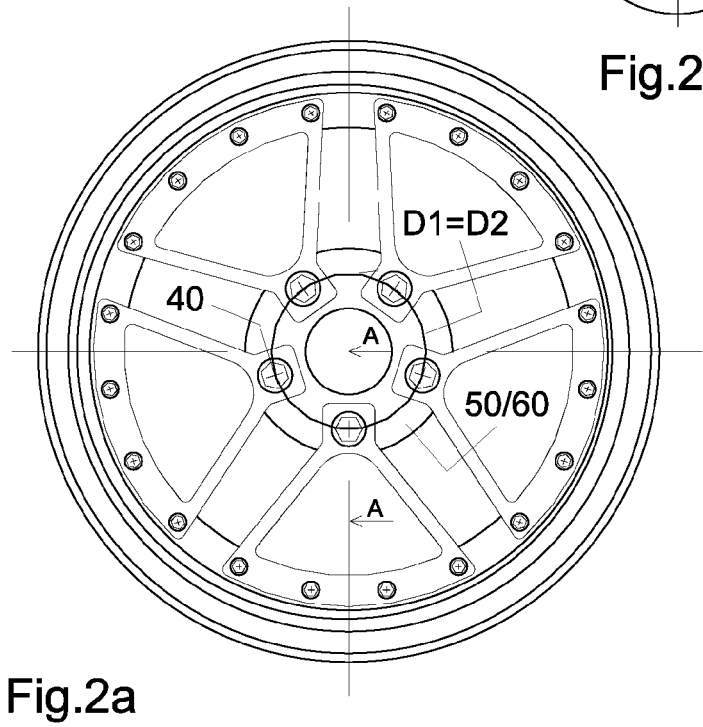
FIG. 2a a wheel structure with the wheel rim and the spoke elements of FIG. 1, wherein the spoke elements are connected to a wheel hub as central part by means of wheel screws.

In FIG. 2a the spoke heads 22 are screwed by means of wheel screws 40 to a central part 50, wherein this central part according to a first preferred embodiment is here a wheel hub 60 of an axle structure of an automobile. FIG. 2b shows the wheel hub 60 illustrated separately. The wheel hub 60 is provided with threaded holes 61, wherein these threaded holes form a second hole circle with a diameter D2. A wheel structure suitable for driving is only produced through the screw connection with the wheel hub 60 from the arrangement of FIG. 1. The wheel hub 60, which is usually assigned to the axle structure of the automobile, therefore forms here at the same time a part of the wheel structure.

Figure 3:
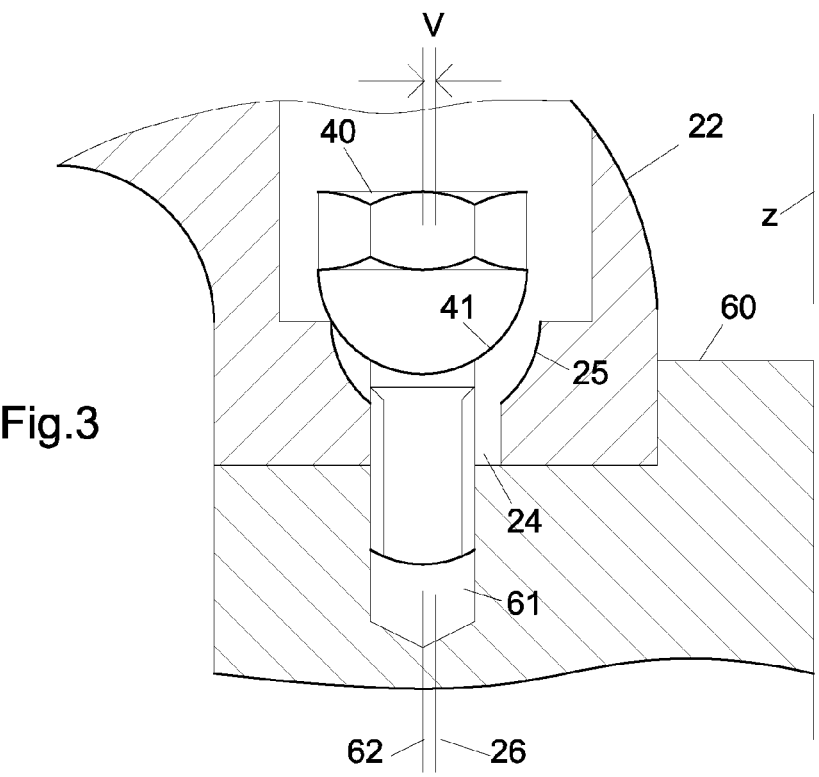
FIG. 3 in section (A-A) the overlapping region of a spoke element with the wheel hub as central part with wheel screw still loose.

FIG. 3 shows in section (A-A) the overlapping region of one of the spoke elements 20 with the wheel hub 60 with a wheel screw 40 still loose, wherein the conditions with respect to the other spoke elements 20 are identical. The wheel screw 40 is only screwed a little into one of the threaded bores 61 of the wheel hub 60. On the underside of its head, the wheel screw 40 is provided with a spherical collar surface 41. A depression 25 of the through-hole 24 in the spoke head 22 has a corresponding spherical collar surface. The axis, designated by 26, of the through-hole 24 is arranged slightly offset (offset V) with respect to the axis, designated by 62, of the threaded bores 61 in the wheel hub 60. This is because the diameter D1 of the first hole circle formed by the through-holes 24 is somewhat smaller than the diameter D2 of the second hole circle formed by the threaded holes 61 in the wheel hub 60, as long as spoke elements 20 are not yet securely screwed to the wheel hub 60. So that the wheel screws 40, despite the offset V of the two axes 26 and 62 with respect to one another can be screwed into the threaded holes 61 of the wheel hub 60, the diameter of the through-holes 24 is selected to be oversized and namely at least so great that the through-holes 24 respectively overlap completely with the threaded holes 61 taking tolerances into consideration.

On tightening of the wheel screws 40, the spherical collar surfaces 41 of the wheel screws 40, with displacement of the spoke elements 20 by the offset V outwards, are drawn into the corresponding depressions 25 of the through-holes 24. The diameter D1 of the first hole circle, formed by the through-holes 24, is extended here to correspond to the diameter D2 of the second hole circle formed by the threaded bores 61 in the wheel hub 60. As the wheel rim 10 offers resistance, a tension of respectively pretension is established between the wheel rim 10 and the wheel hub 60 as central part 50.

Figure 4:
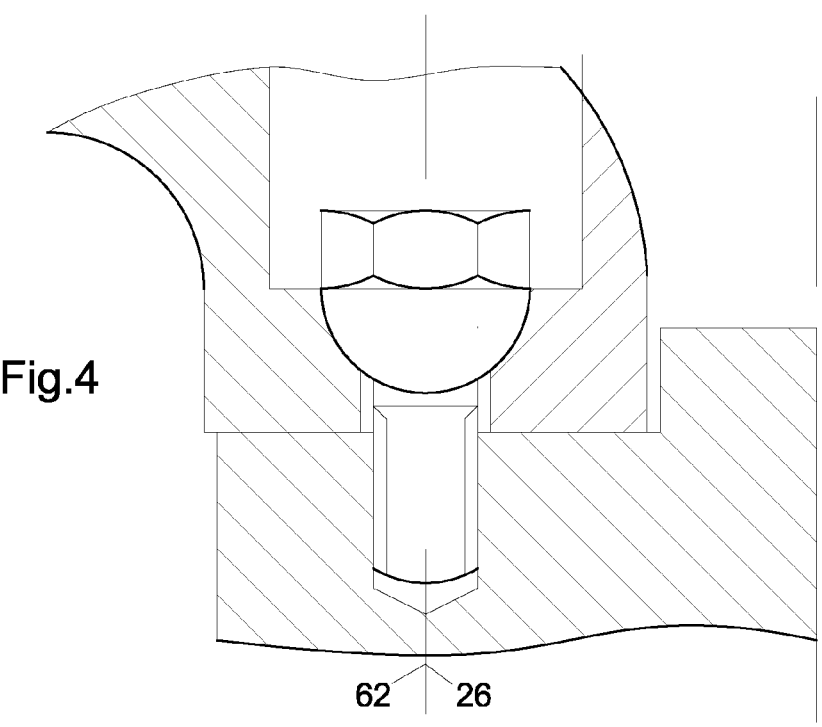
FIG. 4 the overlapping region with tightened wheel screw.

FIG. 4 shows in an identical illustration to FIG. 3 the overlapping region of the spoke element 20 with the wheel hub 60 with a securely tightened wheel screw 40. The axis of the through-hole 24 in the spoke head 22 now coincides with the axis 62 of the threaded bores 61 in the wheel hub 60.

The generated pretension has a particularly favourable effect on the stability of the screw connections between the cross webs 23 of the spoke elements 20 and the rib 11 of the wheel rim 10. Alternating tensile and compressive stresses, such as act on these screw connections per se during rolling motion, are shifted through the pretension into the pressure region. With pure compressive forces, the screw connections are able to be stressed more intensively than with alternating tensile and compressive forces. In particular, cracks originating from the edges of the through-bores for the fastening screws 30 in the material of the cross webs 23 of the rib 11, such as may possibly occur with lengthy constant load, can be effectively prevented.

Figure 5A:
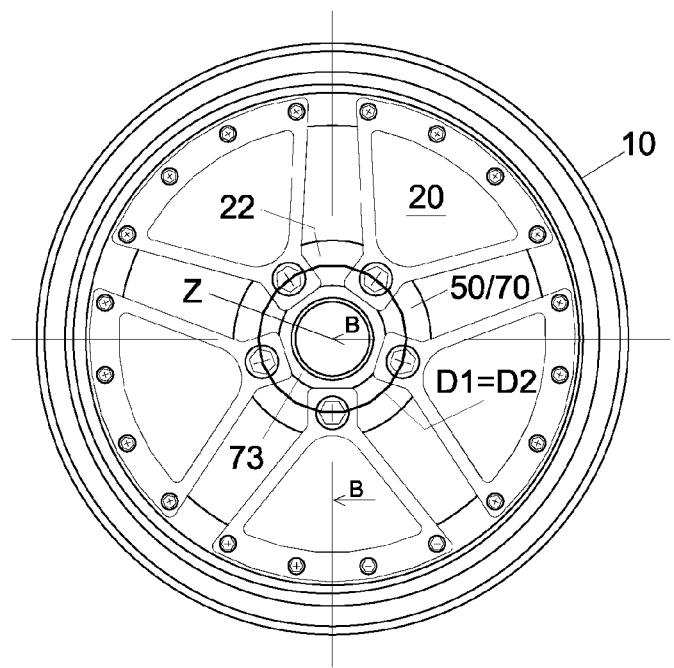
FIG. 5a a wheel structure corresponding to FIG. 2a, wherein the spoke elements are connected to a plate as central part.
Figure 5B:
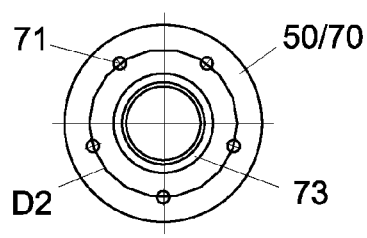
FIG. 5b the central plate.

FIG. 5a shows a further embodiment, in which as central part 50 a plate, designated by 70, suitable for mounting on a wheel hub of an automobile, is pressed in between the spoke elements 20. The plate 70 again only completes the arrangement of FIG. 1 to a wheel structure suitable for driving. FIG. 5b shows the plate 70 illustrated separately. The plate 70 is provided with through-holes 71 for wheel screws, which form a second hole circle with a diameter D2.

Figure 6:
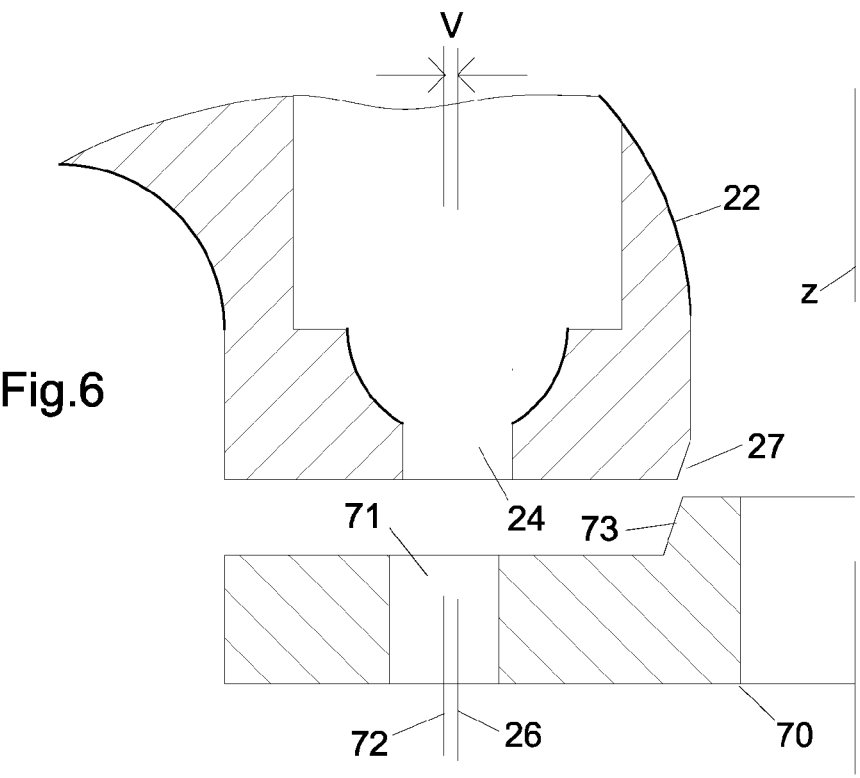
FIG. 6 in section (B-B) the overlapping region of a spoke element with the plate as central part before its reciprocal connection.

FIG. 6 shows in section (B-B) the overlapping region of one of the spoke elements 20 with the plate 70 in a state before the reciprocal connection thereof, wherein the conditions with respect to the other spoke elements 20 are identical. The plate 70 has a chamfered section, for example in the form of an outer taper 73. The spoke elements 20 together form a corresponding inner taper 27 by a mirror-inverted chamfer on their spoke heads 22. The axis of the through-hole 24, designated by 26, in the spoke head 22 is arranged slightly offset with respect to the axis, designated by 72, of the through-hole 71. The same applies to the other through-holes 24 in the spoke heads 22 of the other spoke elements 20 and also to the other through-holes 71 in the plate 70. This is because the diameter D1 of the first hole circle formed by the through-holes 24 is somewhat smaller than the diameter D2 of the second hole circle formed by the through-holes 71 in the plate 70, as long as the spoke elements 20 are not yet securely connected to the plate 70.

For connecting the spoke elements 20 to the plate 70, the latter is pressed by its outer taper 73 into the inner taper 27 formed by the spoke elements 20. Here, the diameter D1 of the first hole circle, formed by the through-holes 24 on the spoke elements 20, is extended to correspond to the diameter D2 of the second hole circle and in so doing again a pretension is established.

Figure 7:
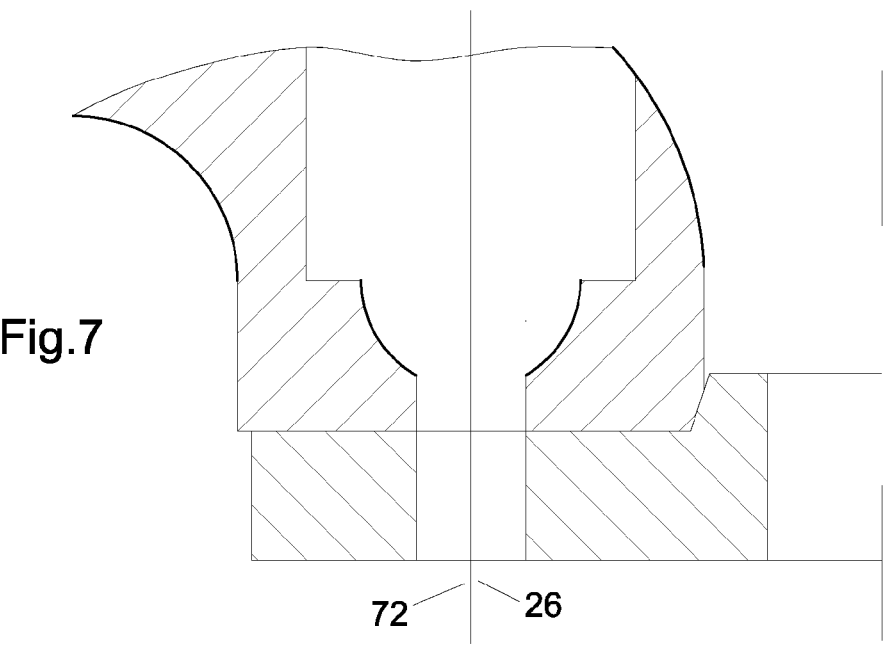
FIG. 7 the overlapping region with produced connection.

FIG. 7 shows in the same illustration as FIG. 6 the overlapping region of the spoke element 20 with the plate 70 after completed pressing of the two parts. The axis 26 of the through-hole 24 in the spoke head 22 is now overlapping with the axis 72 of the through-hole 71 in the plate 70. The pressing in of the plate 70 between the spoke elements 20 therefore has the same effect as the screwing of the spoke elements 20 to the wheel hub 60 in the first embodiment, described by means of FIGS. 2-4. The pretension produced by the pressing in of the plate 70 also in the same manner has a favourable effect on the screw connections between the spoke elements 20 and the wheel rim 10.

The pressing of the plate 70 with the spoke elements 20 and the tension which is thus established are already sufficient in some circumstances for the sufficiently permanent connection of these parts, wherein in the mounted state on a wheel hub they are additionally fixed by the wheel screws which are used for this. If required, however, the parts could be additionally also welded or glued to one another.

In the first embodiment, only spherical collar fits were mentioned. It shall be understood that conical fits would also be possible.

Only wheel screws were mentioned in the examples described above. It shall be understood that instead of wheel screws, wheel bolts could also be used in connection with wheel nuts.

In the further embodiment, the fit between the spoke elements 20 and the plate 70 does not necessarily have to be a circular taper. Mirror-inverted polygonal forms would likewise be possible and are to be included by the term "taper".

For the purpose, aimed for by the invention, of shifting the alternating stresses e.g. to the mentioned screw connections between the cross webs 23 of the spoke elements 20 and the rib 11 of the wheel rim 10 and additionally if applicable the radial calibration of the wheel rim, it is generally sufficient in automobile wheels of conventional size if the offset V is absolutely a few 1/10 mm.

The spoke elements 20 are preferably formed in one piece, wherein they can be produced for example by milling from a blank. Through a greater extent of the spokes 21 in axial direction than in circumferential direction, a high stability is produced with respect to the forces acting on them during driving, with, at the same time, a delicate construction in radial direction, which corresponds to the viewing direction of the observer, when the wheel structure is mounted on an automobile.

LIST OF REFERENCE NUMBERS

10 wheel rim
20 spoke elements
21 spokes
22 spoke heads
23 cross webs
24 through-holes
25 depressions 25 of the through-holes 24
26 axis of the through-holes 24
27 chamfer, inner taper on spoke elements 20
30 fastening screws
40 wheel screws
41 spherical collar surfaces of the wheel screws 40
50 central part
60 wheel hub
61 threaded holes
62 axis of the threaded bores 61
70 plate
71 through-holes
72 axis of the through-holes 71
73 chamfered section, outer taper on the plate 70
D1 diameter of the first hole circle
D2 diameter of the second hole circle
V offset
Z centre

The invention claimed is:

1. A wheel structure for an automobile with a wheel rim, comprising:
   a central part; and
   spoke elements,
   wherein the spoke elements are connected to the wheel rim and can be individually connected to the central part,
   wherein the spoke elements are provided with through-holes for wheel screws or bolts and the central part is provided with holes for screwing in or pushing through same wheel screws or bolts,
   wherein the through-holes of the spoke elements form a first hole circle,
   wherein the holes in the central part form a second hole circle,
   the diameter of the first hole circle is smaller than the diameter of the second hole circle if the spoke elements are not connected to the central part, and
   the diameter of the first hole circle corresponds to the diameter of the second hole circle if the spoke elements are also connected to the central part.

2. The wheel structure according to claim 1, wherein:
   the central part is a plate for mounting on a wheel hub of an automobile,
   the plate has a section in the form of an outer taper,
   the spoke elements together form a corresponding inner taper, and
   the plate is pressed with its outer taper into this inner taper with extending of the diameter of the first hole circle formed by the through-holes on the spoke elements, to correspond to the diameter of the second hole circle.

3. The wheel structure according to claim 1, wherein the spoke elements are screwed to the wheel rim with axially aligned fastening screws.

4. The wheel structure according to claim 1, wherein the spoke elements have respectively a pair of spokes, which continue at the central part into a spoke head provided with one of the through-holes.

5. The wheel structure according to claim 4, wherein the spokes are connected with one another on the wheel rim via a cross web.

6. The wheel structure according to claim 5, wherein the cross web is provided with second through-holes for the fastening screws.

7. The wheel structure according to claim 4, wherein the spokes have a greater extent in axial direction than in circumferential direction.

8. The wheel structure according to claim 1, wherein the spoke elements are embodied in one piece.

9. A wheel structure for an automobile with a wheel rim, comprising:
a central part; and
spoke elements,
wherein the spoke elements are connected to the wheel rim and can be individually connected to the central part,
wherein the spoke elements are provided with through-holes for wheel screws or bolts and the central part is provided with holes for screwing in or pushing through same wheel screws or bolts,
wherein the through-holes of the spoke elements form a first hole circle,
wherein the holes in the central part form a second hole circle,
wherein the diameter of the first hole circle is smaller than the diameter of the second hole circle if the spoke elements are not connected to the central part, and
wherein the diameter of the first hole circle corresponds to the diameter of the second hole circle if the spoke elements are also connected to the central part, and wherein:
the central part is a wheel hub of an automobile,
the through-holes on the spoke elements have respectively a depression in the form of a spherical or conical collar surface, and
the diameter of the through-holes on the spoke elements is dimensioned to respectively completely overlap with the corresponding holes of the second hole circle in the wheel hub when the spoke elements are only connected to the wheel rim, but not also to the central part.

\* \* \* \* \*